US011457369B2

United States Patent
Guan et al.

(10) Patent No.: US 11,457,369 B2
(45) Date of Patent: *Sep. 27, 2022

(54) 5G EDGE CLOUD NETWORK DESIGN

(71) Applicant: AT&T Intellectual Property I, L.P., Atlanta, GA (US)

(72) Inventors: Sichong Guan, Alpharetta, GA (US); Wei Yuan, Frisco, TX (US); Arun Jotshi, Parsippany, NJ (US); Abraham George, Litchfield, CT (US); Carolyn Roche Johnson, Holmdel, NJ (US); Kenichi Futamura, Middletown, NJ (US); Mohan Gawande, Cranbury, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/916,629

(22) Filed: Jun. 30, 2020

(65) Prior Publication Data
US 2020/0336918 A1 Oct. 22, 2020

Related U.S. Application Data

(63) Continuation of application No. 15/950,360, filed on Apr. 11, 2018, now Pat. No. 10,721,631.

(51) Int. Cl.
*H04W 16/18* (2009.01)
*H04W 24/02* (2009.01)
*H04L 41/12* (2022.01)

(52) U.S. Cl.
CPC ........... *H04W 16/18* (2013.01); *H04W 24/02* (2013.01); *H04L 41/12* (2013.01)

(58) Field of Classification Search
CPC ........ H04W 16/18; H04W 24/02; H04L 41/12
See application file for complete search history.

(56) References Cited

U.S. PATENT DOCUMENTS

| 8,437,268 | B2 | 5/2013 | Cai et al. |
| 8,781,392 | B2 | 7/2014 | Viswanath |
| 9,356,680 | B2 | 5/2016 | Kim et al. |

(Continued)

FOREIGN PATENT DOCUMENTS

| KR | 2017-0052446 A | 5/2017 |
| WO | WO 2017/017200 A1 | 2/2017 |

(Continued)

OTHER PUBLICATIONS

Zhang et al.; "Energy-Efficient Offloading for Mobile Edge Computing in 5G Heterogeneous Networks"; IEEE Access Special Section on Green Comm. and Networking for 5G Wireless; vol. 4; 2016; p. 5896-5907.

(Continued)

*Primary Examiner* — Walli Z Butt
*Assistant Examiner* — Ryan C Kavleski
(74) *Attorney, Agent, or Firm* — Guntin & Gust, PLC; Dana Lemoine

(57) ABSTRACT

Systems and methods may use a math programming model for designing an edge cloud network. The edge cloud network design may depend on various factors, including the number of edge cloud nodes, edge cloud node location, or traffic coverage, among other things.

20 Claims, 9 Drawing Sheets

(56) References Cited

U.S. PATENT DOCUMENTS

| | | | |
|---|---|---|---|
| 9,432,794 | B2 | 8/2016 | Agrawal et al. |
| 9,547,828 | B2 | 1/2017 | Mermoud et al. |
| 9,866,637 | B2 | 1/2018 | Doraiswamy et al. |
| 2007/0054670 | A1 | 3/2007 | Kalika et al. |
| 2010/0157808 | A1* | 6/2010 | Puthenpura ........... H04L 41/145 370/254 |
| 2010/0293409 | A1 | 11/2010 | Machida |
| 2012/0226789 | A1 | 9/2012 | Ganesan et al. |
| 2013/0201902 | A1 | 8/2013 | Nagata et al. |
| 2014/0059178 | A1 | 2/2014 | Dutta et al. |
| 2014/0143407 | A1 | 5/2014 | Zhang et al. |
| 2015/0271280 | A1* | 9/2015 | Zhang ..................... H04L 67/22 709/224 |
| 2016/0105489 | A1* | 4/2016 | Llorca ..................... H04L 67/04 709/226 |
| 2016/0140259 | A1 | 5/2016 | Ponamgi |
| 2016/0255140 | A1* | 9/2016 | Shattil ................. H04L 67/1014 709/219 |
| 2016/0301598 | A1 | 10/2016 | Strijkers et al. |
| 2017/0060574 | A1 | 3/2017 | Malladi et al. |
| 2017/0155557 | A1 | 6/2017 | Desai et al. |
| 2017/0272365 | A1 | 9/2017 | Wei et al. |
| 2017/0351241 | A1 | 12/2017 | Bowers et al. |
| 2018/0373268 | A1* | 12/2018 | Antunes Marques Esteves .......... B60L 58/12 |

FOREIGN PATENT DOCUMENTS

| | | |
|---|---|---|
| WO | WO 2017/049439 A1 | 3/2017 |
| WO | WO 2017/078770 A1 | 5/2017 |
| WO | WO 2017/100640 A1 | 6/2017 |
| WO | WO 2017/127102 A1 | 7/2017 |
| WO | WO 2017/151025 A1 | 9/2017 |
| WO | WO 2017/221202 A1 | 12/2017 |
| WO | WO 2018/024257 A1 | 2/2018 |

OTHER PUBLICATIONS

Chen et al.; "Efficient Multi-User Computation Offloading for Mobile-Edge Cloud Computing"; IEEE/ACM Transactions on Networking 24.5; 2016; 14 pages.

Rost et al.; "Cloud Technologies for Flexible 5G Radio Access Networks"; IEEE Communications Magazine; May 2014; p. 68-76.

Chen et al.; "Cloud-based Wireless Network: Virtualized, Reconfigurable, Smart Wireless Network to Enable 5G Technologies"; Mobile Networks and Applications; 2015; 9 pages.

Vilalta et al.; "TelcoFog: A unified flexible fog and cloud computing architecture for 5G networks"; IEEE Communications Magazine 55.8; 2017; 12 pages.

* cited by examiner

5G EDGE CLOUD NETWORK DESIGN

CROSS REFERENCE TO RELATED APPLICATIONS

This application is a continuation of, and claims priority to, U.S. patent application Ser. No. 15/950,360, filed Apr. 11, 2018, entitled 5G EDGE CLOUD NETWORK DESIGN," the entire contents of which are hereby incorporated herein by reference.

TECHNICAL FIELD

The technical field generally relates to edge cloud nodes and, more specifically, to systems and methods for managing edge cloud nodes.

BACKGROUND

Telecommunication carriers are faced with an explosive growth in mobile traffic, as all varieties of applications are communicating over cellular networks. To meet the increasing demand, large amounts of new infrastructure will be needed, which leads to huge capital expenses and operational costs. The new technology may be utilized to expand the capacity of the networks, while keeping expenses relatively low.

SUMMARY

An advance in 5G wireless technology is that it enables the virtualization of the Radio Access Networks (vRAN). In such a design, some functions of the base station (BS) may be moved to a shared infrastructure edge cloud (EC) node. This results in less equipment requirements at the BS location. It also enables sharing network resources such as compute and storage, which can result in significant improvements in key network performance indicators, such as spectral efficiency and energy efficiency. Disclosed herein are systems and methods for building an EC network that may reduce the network investment expenses and improve network performance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
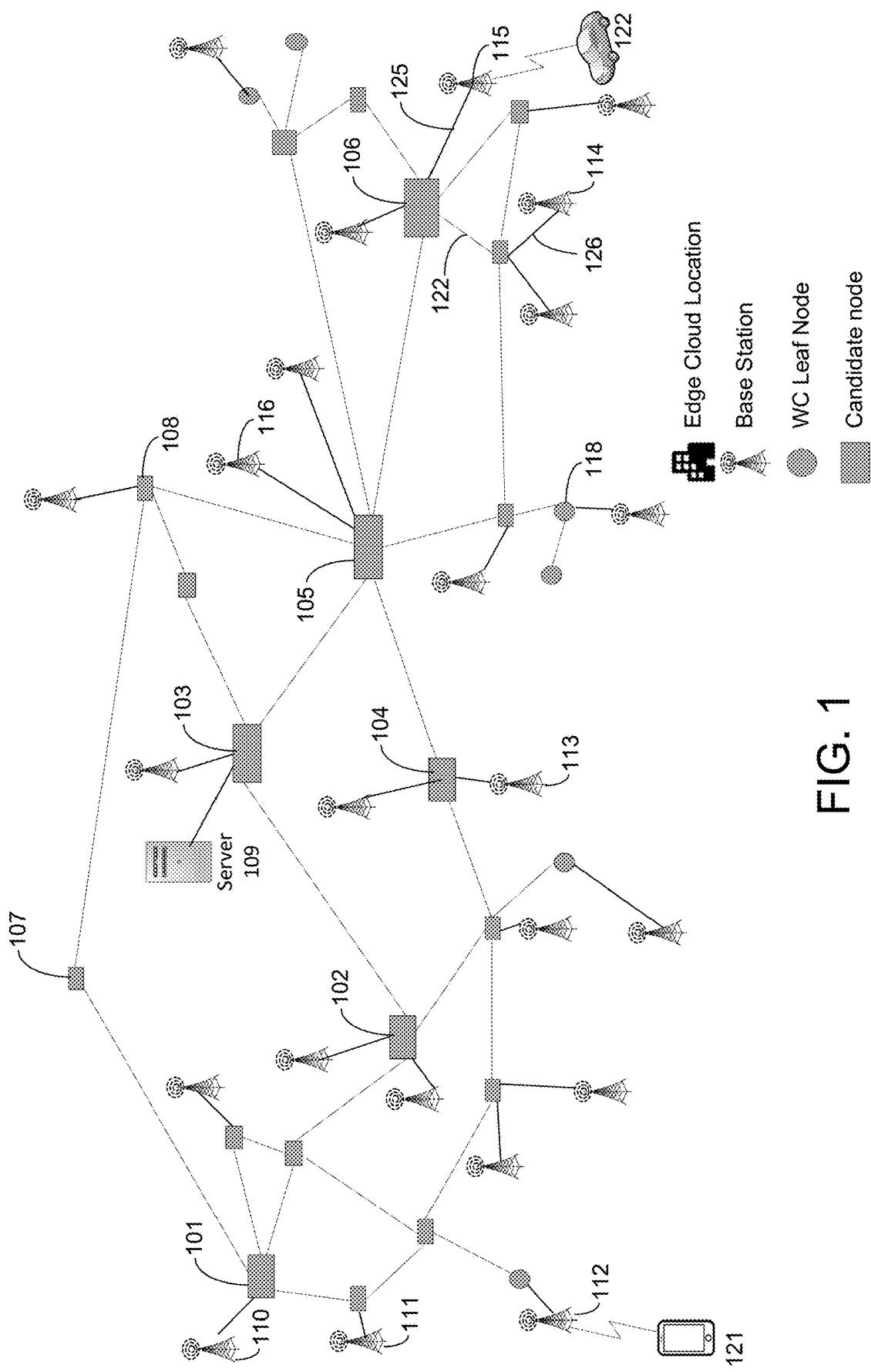
FIG. 1 illustrates an exemplary system that may implement edge cloud network design system as disclosed herein.

Radio access networks (RAN) account for a majority (e.g., 70%~80%) of wireless network expenses. In the current RAN design, base stations (BS) have been dimensioned to handle the local busy-hour traffic. Not only is this design inefficient in terms of resource utilization, but the situation is worsened by the traffic mobility in the network. One of the main advances in 5G wireless technology is that it enables the virtualization of the RAN (vRAN). In such a design, some functions of the BS may be moved to a shared infrastructure EC node. This results in less equipment requirements at the BS location. It also enables sharing network resources such as compute and storage, which can result in significant improvements in key network performance indicators, such as spectral efficiency and energy efficiency. Building an EC network may reduce the network investment expenses and improve network performance.

The EC network design is dependent on the underlying transport network topology. Typically, a BS is connected to a nearby wire center (WC) or a central office (CO) at the edge of the network via a direct fiber link. The CO and other network nodes are interconnected via a fiber transport network. A subset of COs and other network nodes are designated as candidate EC nodes (CEC). If a CEC node is chosen to be an EC node, then compute, storage, and networking capacity should be built at that node location.

In a 5G network, the traffic/signal at the BS is sent to an EC, processed there and sent back to the BS, all via the transport network. The servers at the ECs and the network itself have limited capacity, which needs to be factored into the network design. In order to maintain reliability/resiliency of the network, a BS should be connected to multiple EC's within the latency limits. This will ensure that, if one EC fails (or is down for maintenance) there is another available to serve the traffic. The EC network should cover a specific portion of the traffic determined by strategic or financial motivations.

The disclosed EC network design may minimize the EC network costs, which depend on various factors, including (1) the number of EC nodes, (2) EC node location, (3) investment cost, (4) operation cost, or (5) the BS to EC assignment, among other things. These are determined such that business, engineering, and performance requirements are satisfied. Constraints may include ensuring the following: (1) a certain portion of traffic is covered (coverage constraint); (2) the EC capacities (e.g., computing, storage) are not exceeded (capacity constraint); (3) the transport link capacity (how many traffic can flow through each transport link); (4) to address traffic with different latency classification (e.g., at same BS, traffic for remote surgery and traffic for regular phone conversation may have very different latency requirements and should be treated differently (traffic splicing)); (5) the latency from a BS to the assigned EC through a transport route is within the latency requirement (latency constraint); (6) there is connectivity to multiple ECs with latencies within specified, possibly different, limits; or (7) a specific level of reliability is achieved through redundancy (reliability constraint).

FIG. 1 illustrates an exemplary system that may implement edge cloud network design system as disclosed herein. System 100 includes multiple nodes, such as candidate node 101—candidate node 108. Each candidate node may be a building or the like that a service provider (e.g., mobile phone telecommunications provider) may have network equipment to provide network functions. Network equipment may include servers, storage devices, or the like and network functions may be functions that are used to provide a service for mobile devices (e.g., mobile phone 121, autonomous vehicle 122, or other user equipment). System 100, in addition, includes wireless base station 110—wireless base station 116. Wireless base station 110 (and the others) may be any one of 5G, LTE, Wi-Fi, or the like base stations. There also may be wire center leaf nodes (e.g., WC node 118). In most cases, a base station is connected to a candidate edge cloud node through a wire center. Usually, there is no direct fiber link between a base station and a candidate edge cloud node (CEC), so when the distance between a base station and a CEC is calculated, actually the summation of the distance from the base station to the nearest wire center and the distance between the wire center to that CEC is calculated.

Server 109, for example, may be used to implement the edge cloud network design system as disclosed herein. Server 109 may receive triggers with regard to the factors herein (e.g., FIG. 3, Table 1 and Table 2). Based on these triggers (reaching a threshold for the factors), the server may automatically suggest an update to the edge cloud network design. During different scenarios (e.g., initial implementation, periodic updates, recovery from outages, etc . . . ) determinations may be made with regard to keeping EC network design, as is, or changing the EC network design (e.g., candidate node 108 chosen as an EC node and then is added to ECs already available or replaces an EC, such as EC node 105 of FIG. 4). The edge cloud network design system may also be implemented on any one or more devices as disclosed herein.

Figure 2:
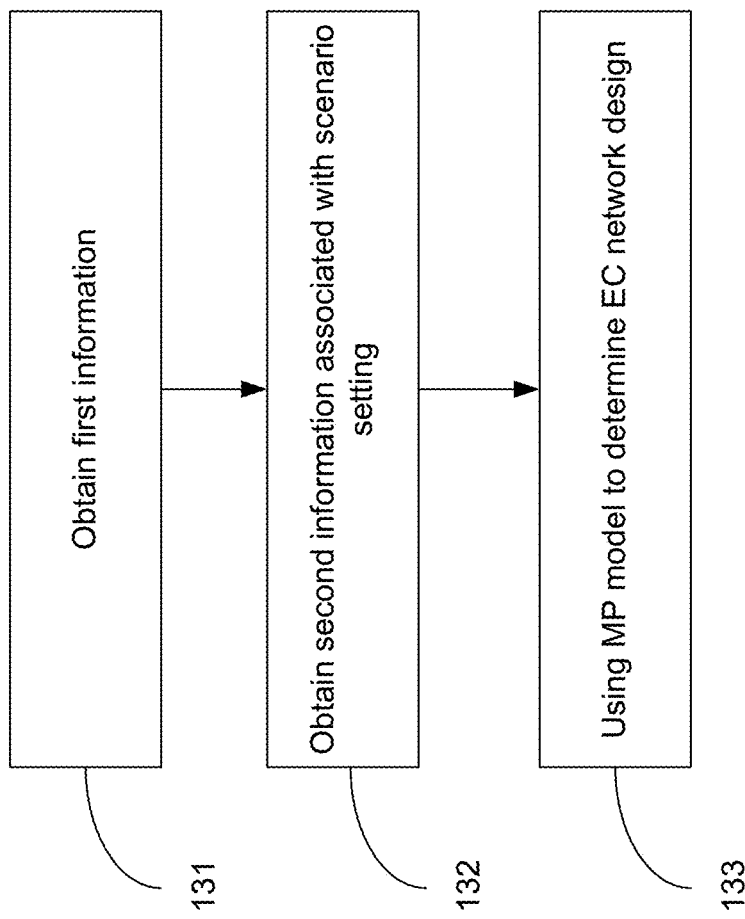
FIG. 2 illustrates an exemplary method for implementing edge cloud network design.

Candidate node 101—candidate node 8, wireless base stations 110—118, mobile device 121—mobile device 122, server 109, and WC node 118 may be communicatively connected with each other. Candidate node 101—candidate node 108, among other similar candidate nodes as shown, may be known as candidate edge cloud (CEC) nodes. Discussed in more detail herein are methods and systems for determining which candidate nodes should become edge cloud nodes. As shown in system 100, candidate nodes (e.g., candidate node 106) may be connected to base stations through one hop (e.g., no intermediary node), such as link 125 that connects wireless base station 115 and candidate node 106 or through multiple hops (e.g., intermediary nodes), such as wireless base station 114 connecting with candidate node 106 through link 126 and link 127 with intermediary candidate node 127. FIG. 2 illustrates an exemplary method for implementing edge cloud network design system in view of FIG. 3. At step 131, first information may be obtained. The first information may include traffic demand forecast 141 (e.g., 5G traffic demand forecast), transport network geographic data 142, network topology data 143 (e.g., fiber network topology), site morphology data 144, cost data 145, shortest BS-WC path data 146, and shortest CO path data 147, among other things. This first information of step 131 may be processed and placed within a database 151, which is disclosed in more detail herein. At step 132, second information may be obtained. The second information may be considered scenario setting information 152, such as latency requirements 148 (e.g. minimum latency over a period between a UE and a EC node), reliability requirements 149, and edge cloud server capacity (e.g., minimum processing capacity of a server, node, or device implementing a particular needed service). The scenario settings may be directly processed using database 151 or sent to math programming model 153. At step 133, based on the first information via the database and the second information, determining edge cloud (EC) network design information 154. The EC network design information 152 may include number of EC nodes needed, location of the EC nodes, or base station to EC assignment, among other things.

Discussed below in more detail are exemplary inputs and outputs associated with implementing an edge cloud network design system (See FIG. 3). Demand forecast 141 may be, for example, a traffic forecast at the base station level. The demand forecast may determined based on information comprising historical data, types of traffic, such as audio, video, voice, global positioning system data, autonomous car related data (e.g., data historically associated with autonomous vehicles-type applications), mobile phone related data, or other UE related data, among other things. Historical traffic data may be based on different periods of weeks, months, or 2 or 3 years. Traffic data may be estimated also based on census information and projections.

Figure 3:
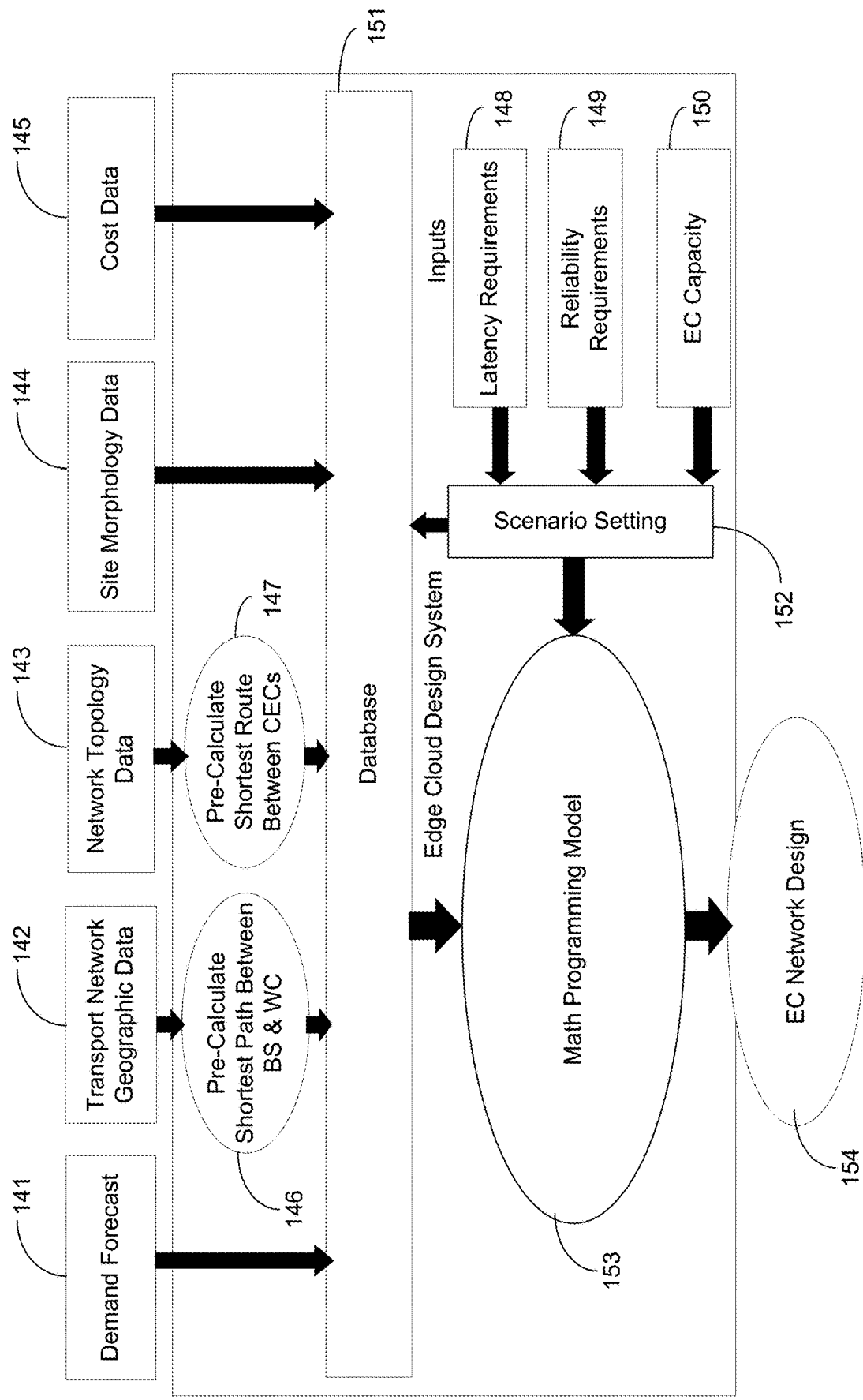
FIG. 3 illustrates an exemplary method for implementing edge cloud network design.

With continued reference to FIG. 3, transport network geographic data 142 may include location of base stations (also disclosed as wireless base station), morphology of base stations, or location of candidate nodes (e.g., central offices), among other things.

Network topology data 143 may include list of nodes, interconnecting links, latency, routing costs, or routing protocols. For example, it may include fiber, nodes, links, or IP network defined on the fiber network, among other things.

Cost data 145 may include EC capital (for different EC options) or transport cost of -candidate node routes. EC capital cost may include construction cost, hardening against floods, hurricanes and external fires cost for power, cooling and inside fire suppressant systems, transport connectivity, equipment or hardware cost. These costs may be proportional to traffic, compute, or storage capacity that may be accommodated at the site. EC options may include a small number of choices of standard EC's sizes. For example, a large EC may include 1000 or more computer servers, and a medium EC may include 500 up to 999 servers, etc. Once the model determines building an edge cloud at a location, it may be used to further choose to build a large, medium, or small EC at that location by iterating on the capacity made available at the location. Transport costs of a route may depend on cost of right of way, fiber, optical, or routing equipment needed at each component of the route.

With continued reference to FIG. 3, a scenario setting input (e.g., second information) may include latency requirements 148, such as based on a function split option. Functional split decision factors may include cost and efforts, operator optimization target, backhaul and RAN constraints, and centralization gains. When considering latency, there may be a determination that certain UEs will need certain consistent threshold roundtrip times. For example, if an area consistently uses autonomous vehicles, which has a 3 ms roundtrip requirement, then that will be considered. Another input may include reliability requirements 149, number of redundant EC nodes required to meet the reliability requirement. Herein, there is usually at least two EC nodes required for each base station. Input may also include percent of traffic required to be covered (e.g., meet latency and reliability requirements).

First Information: With continued reference to FIG. 3, data that may be derived from other data disclosed herein and used as input into database 151, which may include all data with certain format and are requested by the math programming model. Pre-calculated shortest BS-WC path data 146 (e.g., shortest path between base station (BS) and WC), shortest CEC path data 147 (e.g., shortest route between CECs), nearest CEC to each BS, set of feasible pairs of BS and a candidate node (also known herein as candidate EC), or set of routers where the transport link K is included, among other things. CEC also may be referred to as a CO. For the optimization model, exemplary sets and parameters can be broken down as shown in Table 1 and Table 2.

TABLE 1

| Sets |
| --- |
| Sets |
| BS: Set of BSs |
| CSC: Set of EC candidates |
| K: Set of transport links |
| COMB: Set of feasible pairs of BS and CEC |
| NBR: Set of EC candidates within the latency limit for each BS |
| ROU[k]: Set of routes which include transport link k |

TABLE 2

| Parameters |
| --- |
| Parameters |
| T: Traffic at BS |
| Cost$_{EC}$: Cost per EC, construct expenses and EC operation cost |
| Cost per route, operation cost for using transport links |
| Latency, given latency limit at BS |
| Reliability requirements, N (# of redundant ECs required for reliability requirement) |
| % of traffic required to be covered (i.e., meet latency and reliability requirements) |
| Route Length for each route in COMB |
| CAP, Capacity at EC |
| CAP_LINK, Capacity at transport link |

Disclosed below is an exemplary math programming model that may be used. It is contemplated that the below may be altered to fit network designs and other considerations. Below are decision variables. Define a binary variable Y for each EC candidate that takes a value of 1 if the CEC is chosen as an EC, and 0 otherwise $\forall l \in CEC,$ $Y[l] = \begin{cases} 1, & \text{if build } EC \text{ at location } l; \\ 0, & \text{Otherwise;} \end{cases}$ Define a binary variable X for each possible pair of BS and CEC, which takes value 1 if the BS is assigned to a CEC which has been chosen as an EC, 0 otherwise.

$\forall (i, l) \in COMB,$ $X[i, l] = \begin{cases} 1, & \text{if } BS \ i \text{ connect to } ECl; \\ 0, & \text{Otherwise;} \end{cases}$ Below is placement and assignment constraint. A BS can be assigned to an EC location if an EC will be built at that location $\forall l \in CEC$, M is a big number $\Sigma_{(i,l) \in COMB} X[i,l] \leq M * Y[l]$ Below is an objective function which assist in minimizing cost.

$$\text{Min}\left(\sum_{l \in CEC} Cost_{EC}[l] * Y[l] + \sum_{(i,l) \in COMB} Cost_{route}[i, l] * X[i, l]\right)$$

Below is an assignment constraint. A BS can be assigned to at most one EC. $\forall i \in BS,$ $\Sigma_{(i,l) \in COMB} X[i,l] \leq 1$ Below is EC capacity constraints. Aggregated traffic T[i] at EC node≤EC capacity (for compute, storage, networking).

$\Sigma_{i \in BS} \Sigma_{(i,l) \in COMB} X[i,l] * T[i] \leq CAP[l],$

Below is a traffic coverage constraint. Covered traffic by all ECs must be larger or equal to a give percentage of total traffic:

$\Sigma_{i \in BS} \Sigma_{(i,l) \in COMB} X[i,l] * T[i] \geq \%$ of Total_Traffic, Below is a resiliency constraint. At least N EC nodes must be built within latency limits for each BS, $\forall i \in BS,$ $$\sum_{\substack{l \in NBR[i] \\ (i,l) \in COMB}} Y[l] \geq N$$

Below is a latency constraint. The length of the primary route≤latency limit, $\forall i \in BS, \forall (i,l) \in COMB$ $X[i,l] *$route_length$[i,l] \leq$ Latency_limit$[i]$ Below is a transport link capacity constraint. All traffic which flow through transport link k must respect the link capacity $\forall k \in K$ $$\sum_{(i,l) \in ROU[k]} X[i, l] * T[i] \leq CAP\_LINK[k]$$

Below is consideration of traffic splicing. The Traffic at a BS can be divided according to different latency requirements. The traffic notation T[i] actually should be T[i,j], which is the traffic at BS i with latency limit classified as j. By the same token, X[i,l] should be X[i,j,l] which is a binary variable, takes value 1 when traffic at BS i, classified as j will be sent to EC l, otherwise 0. Notation for all related parameters, variables, constraints should be modified accordingly. While the format is kept the same, the notation with traffic classification will become more complicated. For simplicity reason, and without losing generality, we still use current notations.

Figure 4:
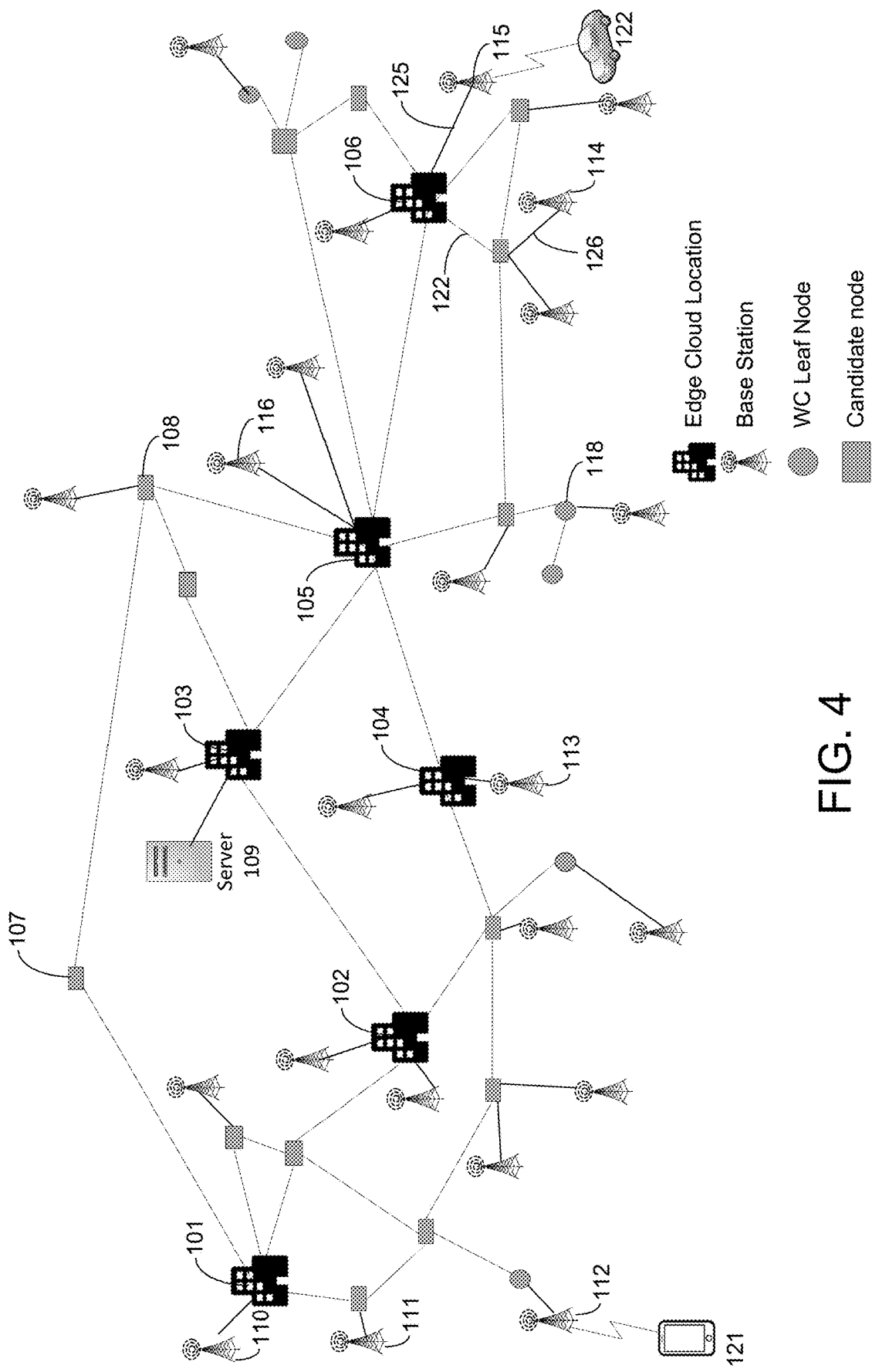
FIG. 4 illustrates an exemplary system that used various inputs to select particular edge cloud nodes.
Figure 5A:
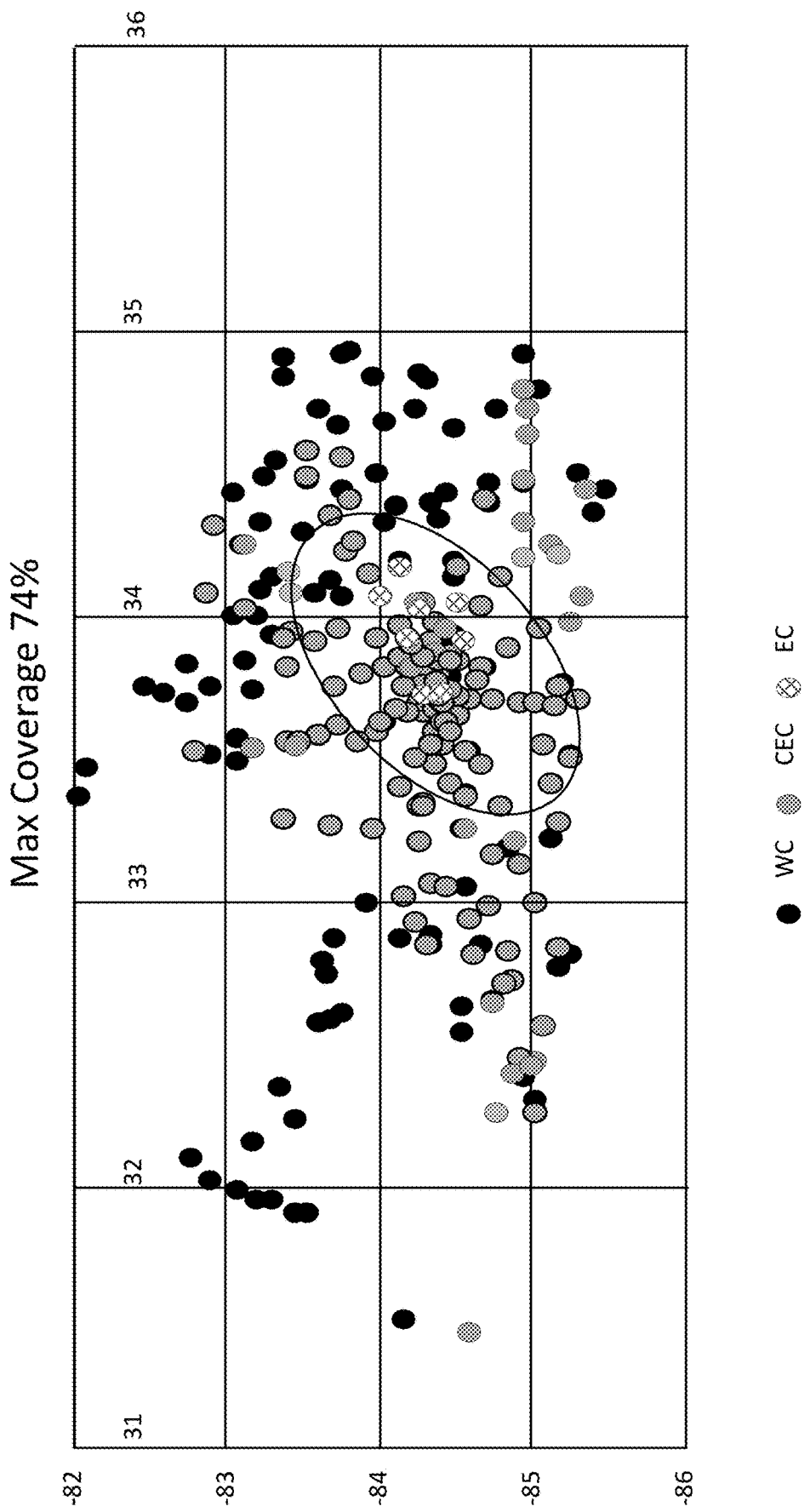
FIG. 5A illustrates an exemplary edge cloud network design based on a first traffic coverage.
Figure 5B:
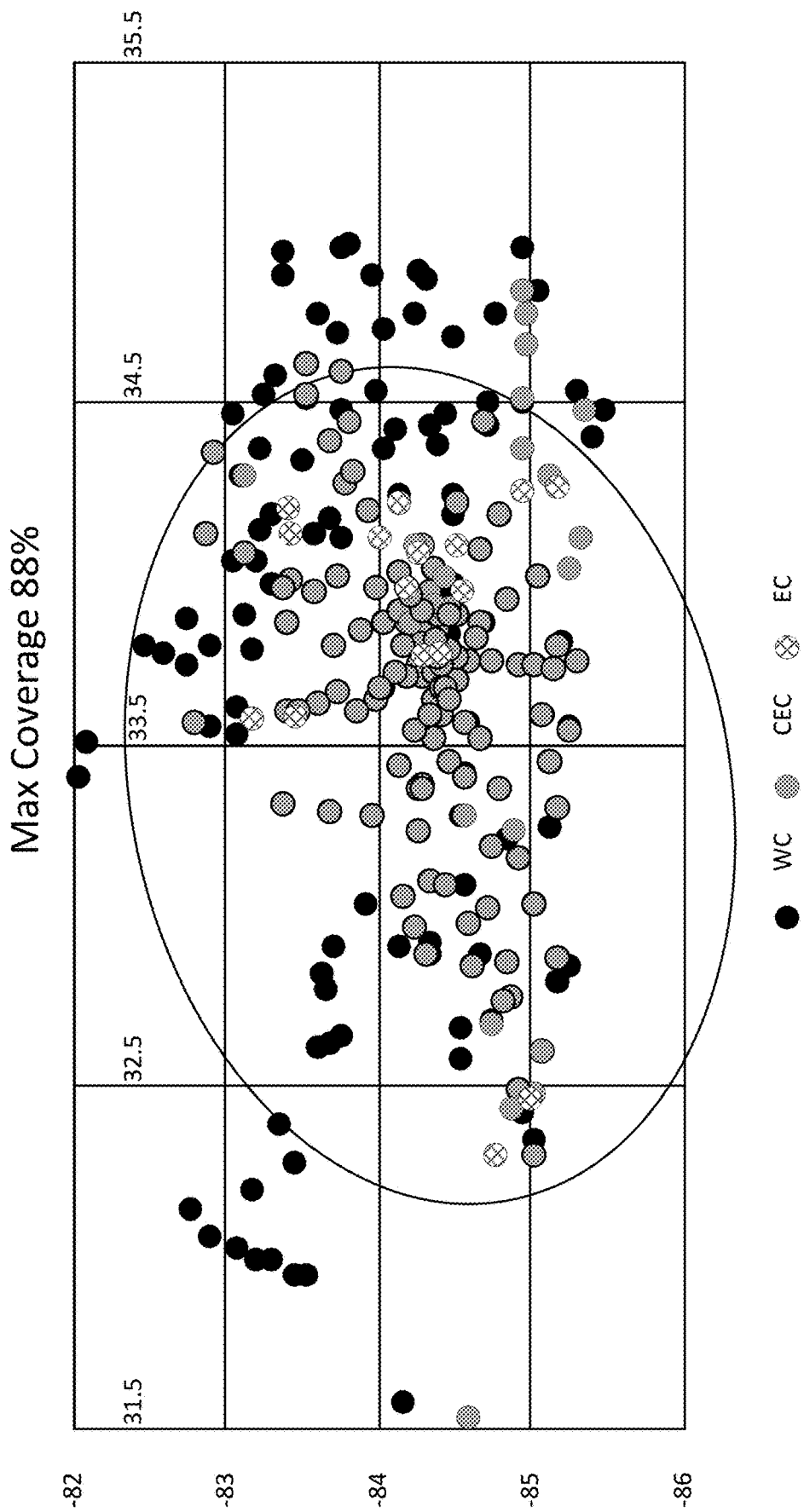
FIG. 5B illustrates an exemplary edge cloud network design based on a second traffic coverage.

After consideration of the input through the different data and math programming models there may be various different outputs. The outputs, again which may be based on the inputs disclosed herein (e.g., associated FIG. 2 and FIG. 3), may be number of EC nodes, location of EC nodes, BS to EC node assignment, investment expenses (e.g., upfront equipment costs), or operation cost (e.g., ongoing cost, such as power and maintenance), among other things. FIG. 4 illustrates an exemplary display of an output after running the considerations in association with FIG. 1 through the network design system disclosed herein. As shown in FIG. 4, there are six EC nodes that meet the desired requirements and other considerations. There may have been a round trip latency limit of 5 ms and a redundancy requirement of two connections to EC nodes within the latency limit, among other things. As disclosed herein, input that may have been considered (e.g., inputted) into the model may have been the number of candidate nodes, the number of base stations, the number of wired centers, or percent of traffic coverage, among other things. FIG. 5A and FIG. 5B show the impact of traffic coverage on edge cloud design. FIG. 5A shows a 74% coverage (e.g., with the factors disclosed herein—FIG. 3, etc . . . ) and FIG. 5B shows an 88% coverage.

Disclosed below are further consideration that provide insight on network design, particularly in the edge cloud context. Cost Reduction Opportunity: RAN Virtualization-RAN virtualization & certain LTE/5G Use Cases require EC network solution at the edge. Where to place the EC nodes at the edge to minimize the total cost, while maintaining key requirements, such as: Latency, resiliency, capacity, transport network topology, etc. & realize the benefits.

This is a large scale optimization problem, in which there are a number of feasible options for how to provide an optimal EC network design. A simple calculation shows that for a case of 170 EC candidates, if 8 of them were chosen as EC nodes (to build how many EC nodes actually should be part of solution, assuming 8 is already known) and ignore the BS to EC assignment (which should be part of solution as well), and assume a computer can calculate cost and do comparison for 10000 options per second, it will take 46.4 years to go through all options. Clearly enumeration is not the way to address this problem.

Disclosed herein is a mathematical programming (MP) approach used to solve this novel issue. MP can eventually achieve the optimal solution without going through all feasible options. The process to build a MP model is to define decision variables, to set up a goal or multiple goals as the objective function to be optimized over all feasible options, and to use equations and inequalities (constraints) to realize the placement and assignment logic and to meet business and engineering requirements. For example, the specific methodology that may be used is Integer Linear Programming (ILP).

In general, ILP problems is called as NP-hard, which can be computationally intractable, the key in solving this type of problems is the scalability of modeling. Another fact is that there are many ways to build ILP models to describe a same problem. So the challenges here to solve this large scale optimization problem are: 1) To build a ILP model which can describe the problem comprehensively; 2) the model must be built in the way such that the number of variables and number of constraints needed to describe the problem are as less as possible; and 3) to put the knowledge (to the problem) into the data pre-processing to further shrink the solution domain.

Most conventional studies in this area assume that the EC nodes have already been setup (knowing how many EC nodes are needed and where to set up them), and focus on EC capacity option and BS assignment. There are multiple differences between conventional studies and the disclosed network design system. Most conventional models, for example, do not consider network reliability (e.g., reliability requirement 149), multiple latency constraints, and traffic splits. The traffic at a base station may include several types and each with its own latency requirement. For example, traffic at a base station may include signals from autonomous cars, which need to be processed and sent back within 3 ms, but for signals from a patient monitoring device, which allow 30 ms latency. That is why, as disclosed herein, the traffic may be split according to their types. Some traffic with short latency requirement (e.g., under 6 ms) may send to a nearby edge cloud node, and other traffic with longer latency requirement (e.g., above 10 ms) may be sent to a central cloud node. With this flexibility, we may be able to design a minimum cost EC network with multiple traffic types. In addition, most conventional models do not consider that a BS may be connected to an EC through a route that may consist of several hops and transport links and a latency limit applied to the route.

The disclosed network design system may need much less EC nodes than conventional approaches for the same traffic coverage requirement. The placement of new EC sites may help satisfy the increased demands required by emerging technologies, such as tactile Internet, smart cars, Internet of Things (IoT), sensor networks, smart homes, etc. The disclosed method may be applied to these emerging technologies, resulting in addressing the unique latency and reliability requirements for implementations connected with the cloud. The disclosed system to determine the placement of these EC nodes, includes various unique constraints or cost objectives. The system may use mathematical programming/optimization or heuristic methods, and is scalable to thousands of EC locations. The network design system may be used as a real-time selector of EC nodes, a software network simulator for 5G network scenario analysis, financial and marketing analysis, and operational planning. The network design system may be used to provide case studies such as: 1) comparing different latency limits vs different network investment expenses; and 2) tradeoffs between investment expenses and network coverage. The disclosed network design system may be used to create a framework for cloud network designs. If a CEC node is chosen to be an EC node, then compute, storage, and networking capacity should be built at that node location. Building here may also may be remotely turning on compute, storage, and networking capacity. For example, automatically turning on shutdown devices or interfaces, the creation of a virtual machine to provide the service, or the like.

Below provides additional perspective on EC network and the disclosed EC network design. What is an EC network and why it is needed? Traffic are signals sent to the network by UEs which may be through wireless communication. For example, a UE (e.g., autonomous car) may get satellite signals for positioning purpose, which cannot be processed by the UE itself, unless the UE installs expensive components. So, UEs send these signals to the network nodes (currently BSs) and then the network will send the processed data (positioning data) back to UEs. To do so, computing capacity and storage capacity must be installed at BSs such that BSs can process these signals. Since multiple (hundreds and thousands) UEs may share the capacity at a BS, it is a saving approach. To install computing capacity and storage capacity at each BS (e.g., a provider may have over 50000 BS) is still expensive. In future networks (e.g., 5G), and EC network may be built, in which the traffic (e.g., signals) of UEs are further sent to EC nodes through BSs, and are processed there. Instead of installing expensive computing and storage capacity at BSs, we now only install them at ECs, and one EC may be shared by multiple BSs (actually, one EC may handle traffic from hundreds of BSs). This EC network design may further reduce costs for a service provider.

Where can we build Edge Cloud nodes (e.g., determine candidate nodes)? A service provider may already own the sites. A service provider may consider whether there is enough space to install equipment, and the sites should be inter-connected with the service provider's network (BSs, other sites, etc.) by links (e.g., fiber links). Generally, then define these locations as the candidates of EC nodes (CECs). In an example, metro area there may be 2000 base stations, and 200 (qualified) CECs, in which (for example purposes) there may be 10 EC nodes that may cover 88 percent of traffic with each BS connected to two redundant EC nodes.

Again, as disclosed herein, EC network design may be based on several considerations, such as capacity, latency, reliability, or traffic coverage, among others. Capacity Consideration: the computing capacity (e.g., CPUs—processing power total, per device, per device catering to a particular service) and storage capacity (e.g., GBs) at an EC are limited and one EC may only handle the traffic sent from certain number of BSs.

Latency consideration: Since the signals of UEs will be sent to ECs through BSs, and processed data will be sent back to UEs, a firm requirement for the round-trip transport time may be calculated or otherwise obtained. Historical latency figures, current ping (or like tests), or distance calculations may be used to determine latency.

Reliability Consideration: To prevent from possible EC failure, it may be required that every BS must be connected to at least two ECs within the latency requirement.

Traffic Coverage requirement: A percentage may be given that requires building ECs so that a certain portion of all BSs (or traffic) will be covered. A BS is covered may mean there is at least two ECs for each BS and the latency requirement is satisfied (distance is considered).

Figure 6:
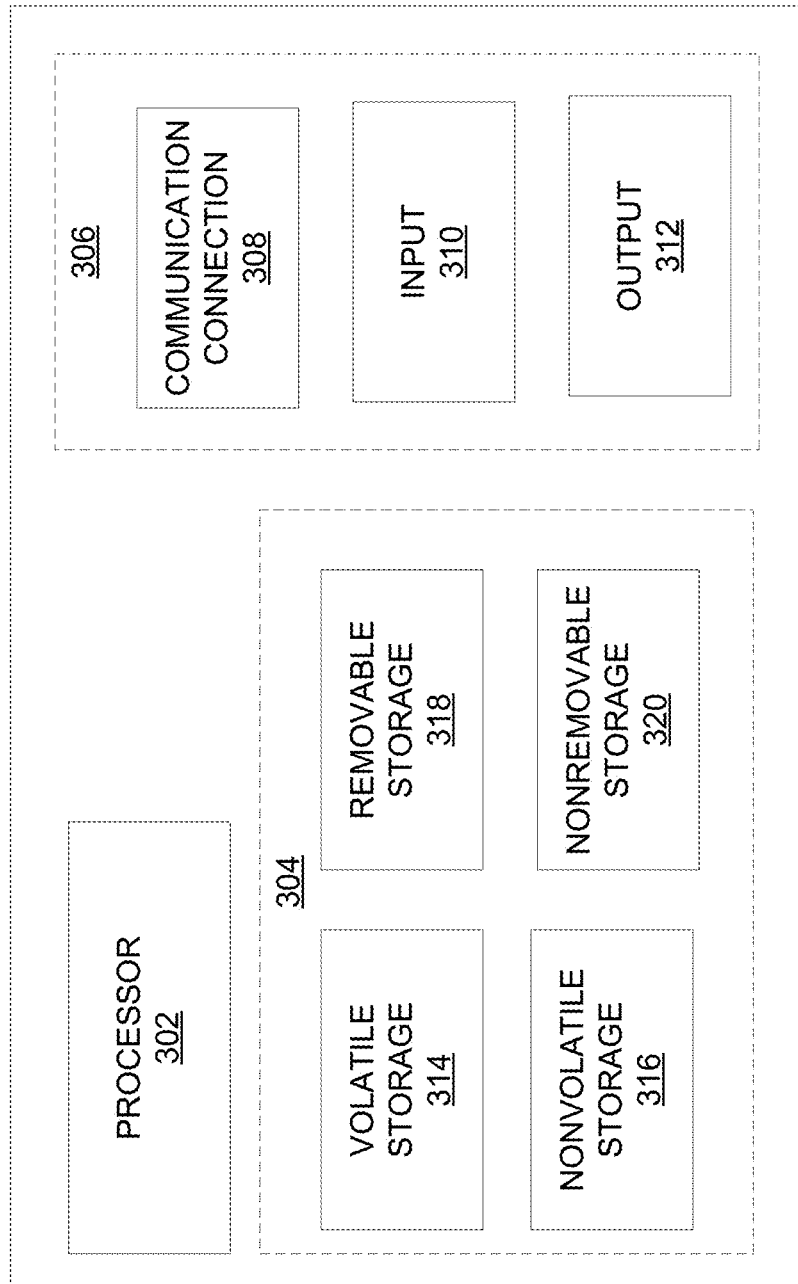
FIG. 6 illustrates a schematic of an exemplary network device.

FIG. 6 is a block diagram of network device 300 that may be connected to or comprise a component of system 100 of FIG. 1 or FIG. 4. Network device 300 may comprise hardware or a combination of hardware and software. The functionality to facilitate telecommunications via a telecommunications network may reside in one or combination of network devices 300. Network device 300 depicted in FIG. 6 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 6 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 6) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 7:
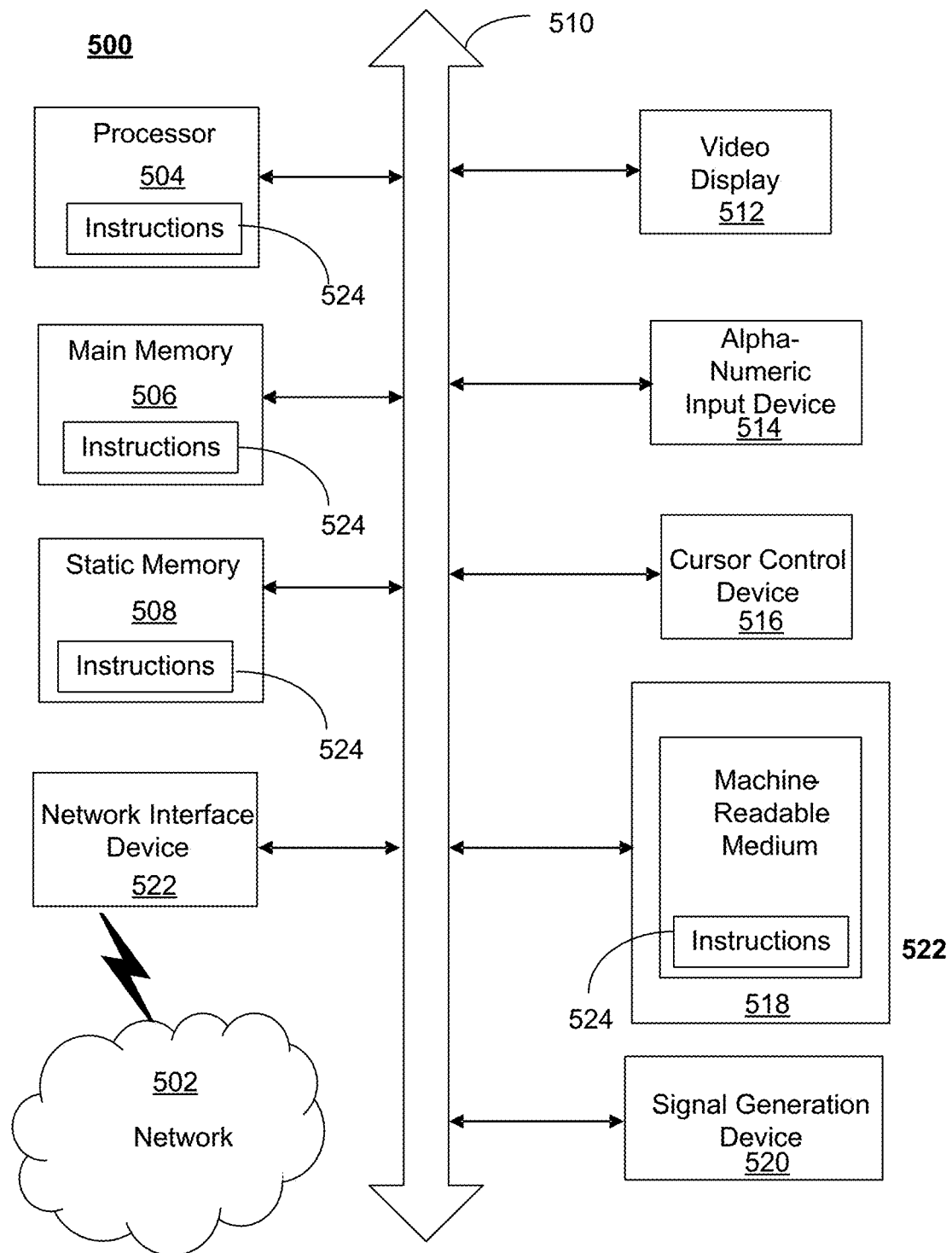
FIG. 7 illustrates an exemplary communication system that provides wireless telecommunication services over wireless communication networks.

FIG. 7 depicts an exemplary diagrammatic representation of a machine in the form of a computer system 500 within which a set of instructions, when executed, may cause the machine to perform any one or more of the methods described above. One or more instances of the machine can operate, for example, as processor 302, server 109, autonomous vehicle 122, mobile phone 121, and other devices of FIG. 1 and FIG. 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 8:
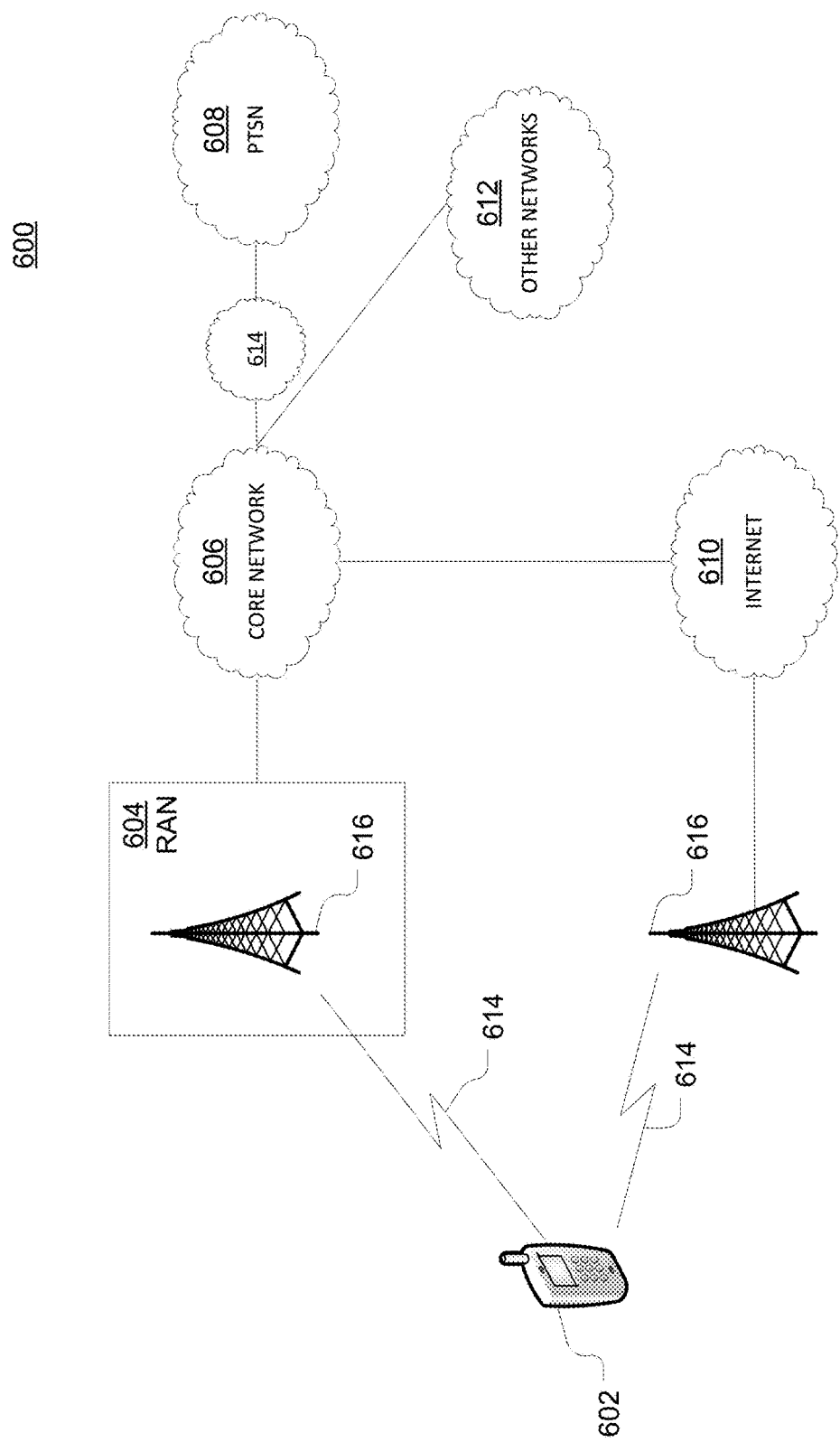
FIG. 8 illustrates an exemplary telecommunications system in which the disclosed methods and processes may be implemented.

As shown in FIG. 8, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise mobile phone 121, autonomous vehicle 122, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA).

WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as 5G, IEEE 602.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 8, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 8, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which information associated with edge cloud network design may be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—edge cloud network design—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein. Services as disclosed herein may include IoT services, such as smart home devices and the services that monitor and respond to them, on-demand entertainment and streaming services, and mobile phone website and applications related services, among others. And right around the corner are new trends such as virtual reality (VR) and augmented reality (AR) work and infotainment services and autonomous transports, This written description uses examples to enable any person skilled in the art to practice the claimed invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for obtaining first information about a telecommunications network, the first information comprising locations of a plurality of central offices and distances between the plurality of central offices and a plurality of base stations; obtaining second information, the second information comprising a minimum number of edge cloud nodes that need to be available to connect to each of the plurality of base stations, wherein the minimum number is two; and based on the first information and the second information, determining an edge cloud network design. There may be an indication of a GPS location of a subset of the plurality of central offices to use as edge cloud nodes based on the determining of the edge cloud network design. The first information may be processed by a database 151 (e.g., FIG. 3) before being used in the determining of the edge cloud network design. The first information and the second information may be processed by using a math programming model such as provided herein in the determining an edge cloud network design. There may be an indication of a minimum number of edge cloud nodes (and the CPU, services, or devices need therein) based on the determining of the edge cloud network design. There may be an indication (e.g., map, table, etc) of an assignment of each of the plurality of base stations to the edge cloud nodes based on the determining of the edge cloud network design. A display may be updated or actual devices within the EC node reconfigured for a particular service to implement an update to a location of a subset of the plurality of central offices to use as edge cloud nodes based on the determining of the edge cloud network design. The first information may further comprise a traffic coverage for the edge cloud network design, wherein the traffic coverage is based on a traffic forecast based on historical paging traffic data, historical tracking area update traffic data, autonomous vehicle related traffic data, or other historical traffic data corresponding to a service. The network device may be server or user equipment. The network device may send instructions to other devices in the network to obtain the information which may be result of real-time testing by the other devices. Terminal node (e.g., base station) process, receive, or send certain amount of traffic, data, computing capacity or storage capacity. Terminal nodes may include wireless base stations which serve a variety of end devices, such as mobile phones, point of sale terminals, devices of data centers, devices of residences with internet, devices associated with computing and entertainment services, game consoles, Internet of Things (IOT) devices, remote vehicles, or factory equipment, among other things. An intermediate office (e.g., central office) may include a data transport network of interconnected nodes links and nodes. All combinations in this paragraph (including the removal or addition of steps) are contemplated in a manner that is consistent with the other portions of the detailed description.

What is claimed:

1. A system comprising:
   one or more processors; and
   memory coupled with the one or more processors, the memory comprising executable instructions that when executed by the one or more processors cause the one or more processors to effectuate operations comprising:
      receiving information about a telecommunications network, the information comprising:
         a first latency requirement for a first data traffic type, wherein the first data traffic type includes data traffic from autonomous vehicles;
         a first redundancy requirement for the first data traffic type;
         routes and latencies between a first edge cloud node and a plurality of candidate edge cloud nodes; and
         respective locations of the plurality of candidate edge cloud nodes;
      based on the information, assigning a candidate edge cloud node of the plurality of candidate edge cloud nodes to be a second edge cloud node of the telecommunications network; and
      providing instructions to update an edge cloud network design to indicate the second edge cloud node.

2. The system of claim 1, the operations further comprise providing an indication of a location of a subset of a plurality of intermediate offices to use for edge cloud nodes based on the update of the edge cloud network design.

3. The system of claim 1, wherein the information is processed using a math programming model for determining the edge cloud network design.

4. The system of claim 1, the operations further comprise providing an indication of a minimum number of edge cloud nodes based on the update of the edge cloud network design.

5. The system of claim 1, the operations further comprise providing an indication of an assignment of each of a plurality of terminal nodes to edge cloud nodes based on the update of the edge cloud network design.

6. The system of claim 1, the operations further comprise providing instructions to update a location of a subset of a plurality of intermediate offices to use for edge cloud nodes based on the update of the edge cloud network design.

7. The system of claim 1, wherein the information further comprises a traffic coverage for the edge cloud network design, wherein the traffic coverage is based on a traffic forecast.

8. The system of claim 1, wherein the information further comprises a traffic coverage for the edge cloud network design, wherein the traffic coverage is based on a traffic forecast, wherein the traffic forecast is based on historical paging traffic data.

9. The system of claim 1, wherein the information further comprises a traffic coverage for the edge cloud network design, wherein the traffic coverage is based on a traffic forecast, wherein the traffic forecast is based on historical tracking area update traffic data.

10. The system of claim 1, wherein the information further comprises a traffic coverage for the edge cloud network design, wherein the traffic coverage is based on a traffic forecast, wherein the traffic forecast is based on autonomous vehicle related traffic data.

11. The system of claim 1, wherein the information further comprises a minimum latency between a plurality of intermediate offices and a user equipment.

12. The system of claim 1, wherein the information further comprises a processing capacity of devices located at an intermediate office that implement a service.

13. A method comprising:
receiving, by a processor, information about a telecommunications network, the information comprising:
a first latency requirement for a first data traffic type, wherein the first data traffic type includes data traffic from autonomous vehicles;
a first redundancy requirement for the first data traffic type;
routes and latencies between a first edge cloud node and a plurality of candidate edge cloud nodes; and
respective locations of the plurality of candidate edge cloud nodes;
based on the information, assigning, by the processor, a candidate edge cloud node of the plurality of candidate edge cloud nodes to become a second edge cloud node of the telecommunications network; and
providing, by the processor, instructions to update an edge cloud network design to indicate the second edge cloud node.

14. The method of claim 13, further comprising providing an indication of a location of a subset of a plurality of intermediate offices to use for edge cloud nodes based on the update of the edge cloud network design.

15. The method of claim 13, wherein the information is processed using a math programming model for determining the edge cloud network design.

16. The method of claim 13, further comprising providing an indication of a minimum number of edge cloud nodes based on the update of the edge cloud network design.

17. A computer readable storage medium storing computer executable instructions that when executed by a computing device cause said computing device to effectuate operations comprising:
receiving information about a telecommunications network, the information comprising:
a first latency requirement for a first data traffic type, wherein the first data traffic type includes data traffic from autonomous vehicles;
a first redundancy requirement for the first data traffic type;
routes and latencies between a first edge cloud node and a plurality of candidate edge cloud nodes; and
respective locations of the plurality of candidate edge cloud nodes;
based on the information, assigning a candidate edge cloud node of the plurality of candidate edge cloud nodes to become a second edge cloud node of the telecommunications network; and
providing instructions to update an edge cloud network design to indicate the second edge cloud node.

18. The computer readable storage medium of claim 17, wherein the information further comprises a traffic coverage for the edge cloud network design, wherein the traffic coverage is based on a traffic forecast, wherein the traffic forecast is based on autonomous vehicle related traffic data.

19. The computer readable storage medium of claim 17, wherein the information further comprises a minimum latency between a plurality of intermediate offices and a user equipment.

20. The computer readable storage medium of claim 17, wherein the information further comprises a processing capacity of devices located at an intermediate office that implement a service.

* * * * *